United States Patent [19]

O'Brien et al.

[11] Patent Number: 5,056,573
[45] Date of Patent: Oct. 15, 1991

[54] REDUCED VIBRATION PNEUMATIC TRACTOR TIRE

[76] Inventors: Jimmie P. O'Brien, 33 Spindrift La., Milford, Conn. 06460; James P. Mueller, Seven Alexander Dr., West Haven, Conn. 06516

[21] Appl. No.: 478,543

[22] Filed: Feb. 12, 1990

[51] Int. Cl.⁵ .............................................. B60C 11/03
[52] U.S. Cl. .......................... 152/209 B; 152/209 WT
[58] Field of Search ........ 152/209 B, 209 A, 209 WT, 152/209 R

[56] References Cited

U.S. PATENT DOCUMENTS

| | | | |
|---|---|---|---|
| 4,383,567 | 5/1983 | Crum et al. | 152/209 B |
| 4,611,647 | 9/1986 | Rimondi | 152/209 B |
| 4,727,917 | 3/1988 | Stewart | 152/209 B |
| 4,791,971 | 12/1988 | Shinn | 152/209 B |

Primary Examiner—Caleb Weston
Assistant Examiner—Nancy T. Krawczyk

[57] ABSTRACT

A pneumatic tire, particularly for tractors or other like vehicles, having a tread portion containing alternating, spaced-apart medium and long lugs proceeding axially inward from a lateral tread edge, and an identical (but opposite in hand) set of long and medium lugs proceeding axially inward from the other lateral tread edge and offset circumferentially so that a long lug emanating from one lateral edge is opposite a medium lug emanating from the other lateral edge. The lugs have bar portions which are smoothly curved axially inward from the tread edge in the direction of intended tire rotation and bulbous head portions transitioned into the bar portions axially inward thereof, to provide excellent traction and wear characteristics while minimizing vibration.

13 Claims, 3 Drawing Sheets

REDUCED VIBRATION PNEUMATIC TRACTOR TIRE

BACKGROUND OF THE INVENTION

The present invention relates to pneumatic tires and, more particularly, to pneumatic tires designed for use on the drive axles of farm tractors and similar vehicles.

In order to enable tractors to pull plows or other like farming implements through the ground, it is necessary to provide on the tractor drive axles tires which develop sufficient traction in the soil under the encountered load conditions. Typically, this property is sought to be achieved by provision on the tire tread of a plurality of spaced-apart, generally transverse, discrete upstanding tread bars or "lugs" which are capable of biting into the soil in which the tractor is operated. A variety of such lug tread designs has been utilized or proposed in the art for purposes of increasing traction through improved biting capability and efficient explusion of earth from the deep recesses between the lugs. Such designs are also required to take into account the wear characteristics of the tread lugs.

The utilization of discrete lugs raised substantially above the base tread surface for improving the traction of tractor tires in generally encountered soil conditions is known to introduce tire and vehicle vibrations which affect ride comfort and vehicle stability, and impose stress on the drive axle. Vibration of this type is encountered when the tractor is used in the field, and is particularly noticeable when the tractor is driven on hard soil or paved surfaces as it occasionally must be, particularly at speeds above about ten miles per hour. Often, designers and manufacturers of pneumatic tractor tires face a compromise situation between traction capability on the one hand and minimized vibration/maximized stability on the other hand.

SUMMARY OF THE INVENTION

It is an object of the present invention to provide a pneumatic tractor tire exhibiting improved traction characteristics in generally encountered conditions of tractor use, as well as reduced vibrational characteristics in those conditions of use and reduced vibration and improved stability on hard dirt or paved roads.

These and other objects are obtained in the present invention by the provision of a pneumatic tractor tire having a ground surface-engaging tread portion surrounding a reinforcing carcass, wherein the tread portion is comprised of two sets of alternating long and medium lugs disposed about the circumferential periphery of the tread, the first set of alternating long and medium lugs emanating from one lateral edge of the tread and extending axially inward thereof, and the second set of alternating long and medium lugs emanating from the other lateral tread edge and extending axially inward thereof, with the two sets of alternating long and medium lugs being disposed such that the emanating point from the lateral tread edge for a long lug in the first set is substantially directly opposite the emanating point from the opposite lateral tread edge for a medium lug in the second set, and the emanating point from the lateral tread edge for a medium lug in the first set is substantially directly opposite the emanating point from the opposite lateral tread edge for a long lug in the second set. In each lug set, the alternating long and medium lugs are disposed about the circumferential periphery of the tread in a spaced-apart manner, i.e., such that recessed void space exists between each alternating lug, and the spacing is substantially uniform, i.e., the emanation point of each long or medium lug along the lateral tread edge in each set is substantially equally spaced apart along the lateral tread edge from the emanation point of the next alternating lug.

Each long and medium lug is substantially comprised of a smoothly curved bar portion having a width defined by spaced-apart leading and trailing edges, with a generally bulbous head portion smoothly transitioned into the regular bar portion at the axially inward terminating area of the lug, the bulbous head portion having a rounded leading edge.

The bar portion of each lug is smoothly curved along its length from its emanation point along the tread edge to its termination point axially inward thereof, i.e., where it transitions into the bulbous head portion, the direction of axially inward curvature being in the direction of intended tire rotation. The leading and trailing edges of the bar portion for all the long and medium lugs are defined by the same radius of curvature, and the curvature angle of the bar portion of the lugs, with reference to an axis perpendicular to the tread centerline, increases as the bar portion progresses axially inward toward the centerline. Each long lug, taken in its entirety (i.e., bar portion and bulbous head portion), extends axially inward a short distance beyond the tread centerline, and each medium lug, which in essence is a shortened version of the long lug, terminates axially inward a short distance before the centerline.

By reason of the foregoing construction of the tread portion, a tractor tire is provided which is characterized by excellent traction in the soft soil conditions in which it normally operates. Notwithstanding their curvature, the lugs still possess a substantial component normal to the direction of tire rotation, and can be provided in sufficiently large number about the tire, for improved traction, yet, the tread construction still results in substantial void space between lugs so as to promote natural cleanability, aided further by the smooth curvature of the lugs. At the same time, the overall lug symmetry and the increased curvature of the lugs as they approach the centerline reduces the void space at that area and provides a smooth and relatively short transition from lug to lug so as to promote riding comfort and reduce transitional thumping as the tire moves through the footprint. Side to side rocking and the associated lateral vibration also is reduced by the lug symmetry and smooth curvature, and overall wear characteristics are also greatly improved by reason of the fairly substantial length of the medium lugs, the curvature of the lugs, and the expanded bulbous portion at the terminal point of each lug at or near the centerline.

DETAILED DESCRIPTION OF THE INVENTION

Figure 1:
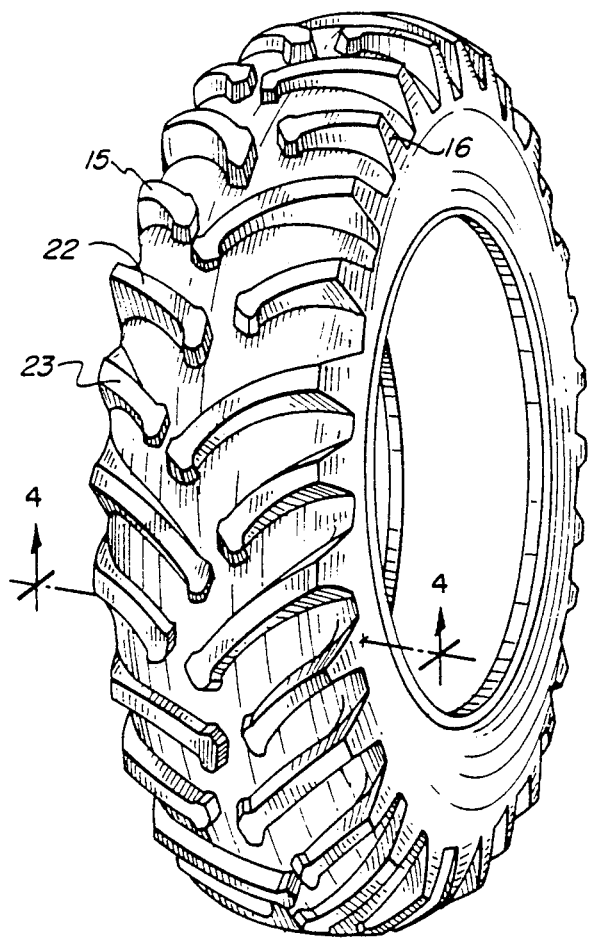
FIG. 1 is a perspective view of a radial tractor tire constructed in accordance with the invention.

As illustrated in the figures, tractor tire 20 consists of a tread portion (10) overlying a reinforcing carcass (11). The carcass consists of one or more plies of reinforcing material (e.g., filaments, textile) extending about the tire and anchored around a pair of generally inextensible annular beads (12) and (12'). As is well known in the art, the carcass reinforcement structure (11) can be either of radial or bias ply type, with a radial construction being preferred and illustrated in the figures herein. The tread portion can be reinforced by belts (e.g., (13)) which extend circumferentially around the tire between the tread 10 and carcass (11). Sidewall areas (14) and (14') extend from the tread portion (10) radially inward to beads (12) and (12').

Tread portion (10) comprises opposed shoulder portions or tread edges (15) and (16) from which emanate the upstanding tread bars (lugs) (22, 23) with recesses therebetween. A centerline (18) exists which extends about the circumference of the tread surface midway between the tread edges (15) and (16), and references herein to axial inward or axial outward directions are with reference to this centerline, i.e., from a tread edge toward the centerline or from the centerline toward a tread edge, respectively.

Figure 2:
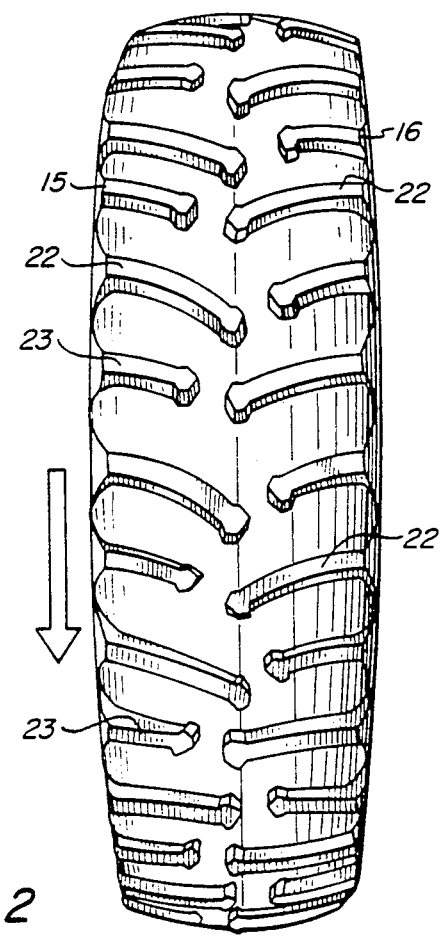
FIG. 2 is a front elevation view of the tire of FIG. 1.
Figure 3:
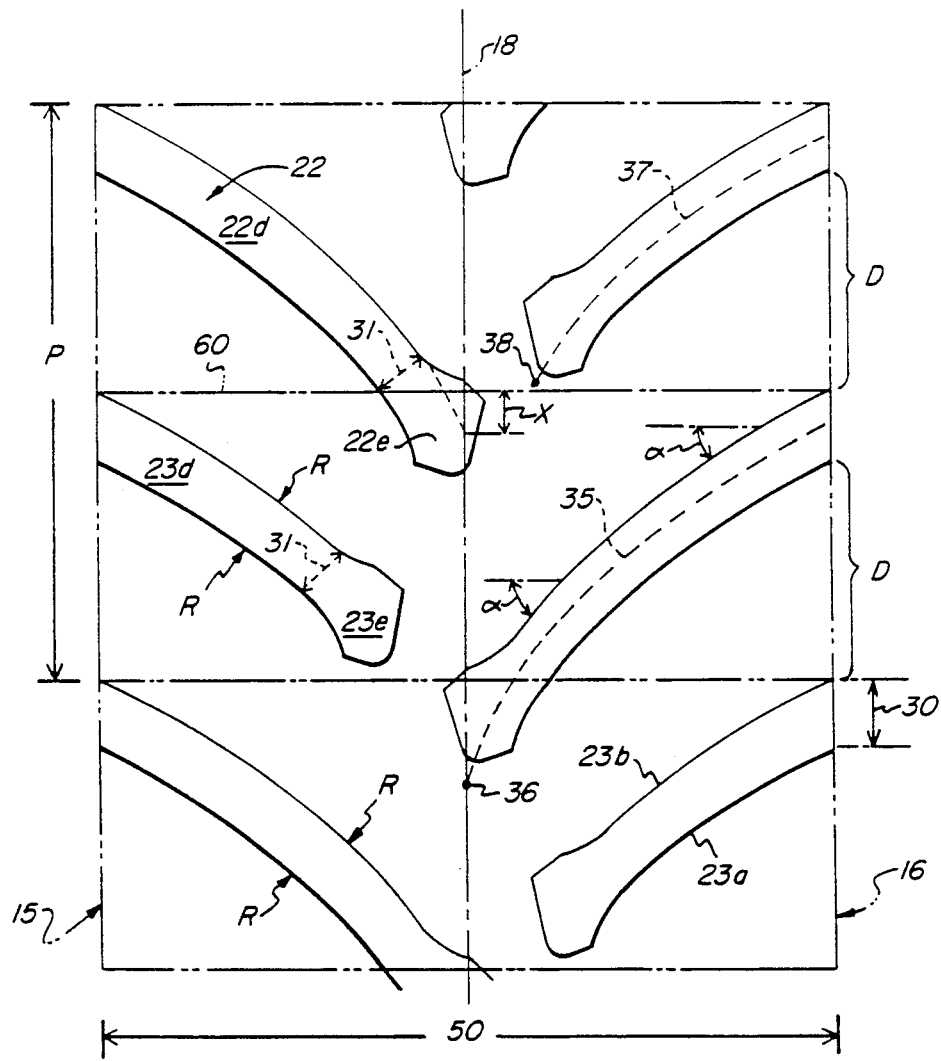
FIG. 3 is a plan view of a section of the tread of the tire of FIGS. 1 and 2.
Figure 4:
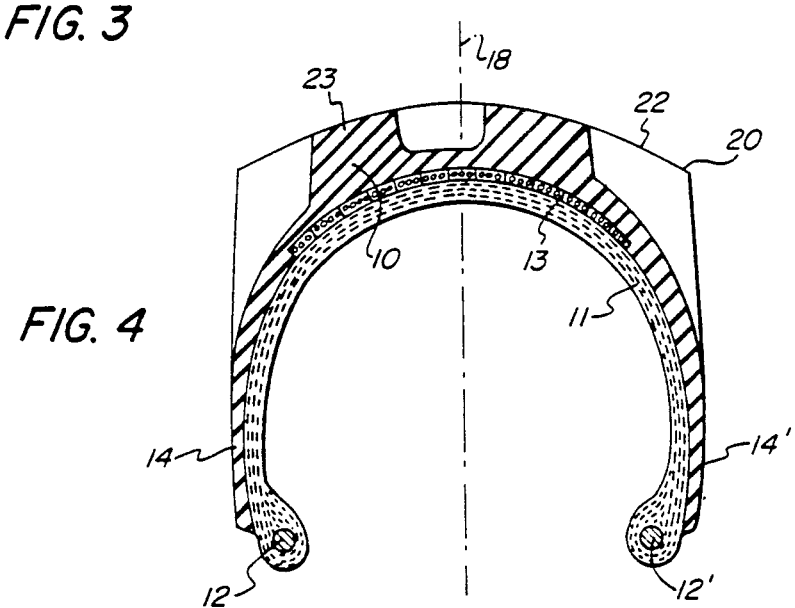
FIG. 4 is a cross-sectional view of a tractor tire constructed in accordance with the invention, taken substantially across the line 4—4 of FIG. 3.

As shown in detail in FIG. 3 and in perspective in FIGS. 1 and 2, alternating long lugs (22) and medium lugs (23) extend axially inward from the lateral tread edges, and can be considered as one set of alternating long and medium lugs emanating from one tread edge (e.g., 15), and a second set of alternating long and short lugs emanating from the opposite tread edge (e.g., 16). The alternating arrangement of the long and medium lugs in each set is such that, across the width of the tread, a long lug is opposite a medium lug and vice-versa. Stated in other terms, the point or area along a given tread edge from which a long lug emanates is substantially directly opposite the corresponding point or area at the opposite tread edge where a medium lug emanates, and vice-versa. In each alternating lug set, the emanating points for the alternating long and medium lugs are generally equally spaced apart along the tread edge. Thus, for example, the distance (measured along the tread edge, i.e., distance "D" in FIG. 3) between the emanation point of the leading edge of one lug and the emanation point of the trailing edge of the next alternating lug will be substantially the same for all alternating lugs around the tire tread. It should be noted that the tread design is of the uni-directional type, i.e., it is designed for a tire intended to rotate in a given direction (shown by the arrow in FIG. 2). Thus, the leading edge of a lug is that edge which contacts the ground first as the tire rotates in its intended forward path of travel, and the trailing edge of a lug is that edge which contacts the ground last. As seen in FIG. 3, edges (23a) and (23b) are the leading and trailing edges, respectively, for the medium lug (23).

Each of the long lugs (22) and medium lugs (23) is comprised of a bar portion (22d and 23d, respectively, as illustrated in FIG. 3), defined by the spaced-apart leading and trailing edges, which is smoothly curved in shape along its length from its emanation point on the lateral tread edge (15) or (16) and axially inward, with the direction of curvature being in the direction of intended tire rotation. Each of the long and medium lugs terminates in a bulbous portion (22e and 23e, respectively, as illustrated in FIG. 3) which is smoothly transitioned into the bar portion, and whose preferred construction is described in further detail hereinafter.

For each curved bar portion of each lug, the curvature of the leading edge and the curvature of the trailing edge are each defined by the same radius of curvature. For determining an appropriate radius of curvature, use is made of the pitch length (P) and the number of pitches around the tire (N). A pitch is that portion about the circumference of the tire which includes one entire long lug and one entire medium lug of any given alternating lug set, i.e., either the set emanating from tread edge (15) or the opposite set emanating from tread edge (16), and proceeds from the trailing edge of either a long or medium lug to the trailing edge of the next similar lug emanating from the same tread edge. The pitch length is the length of the pitch (e.g., as measured at the tread shoulder or edge as shown by length P in FIG. 3), and is the same for each pitch given the equal spacing of alternating long and medium lugs. The number of pitches for any one set of alternating long and medium lugs emanating from a given tread edge is a whole number, and is the same as the number of pitches in the opposite set of alternating long and medium lugs, i.e., those emanating from the opposite tread edge. Half pitch lines are designated as (60) in the figures.

For a given tire circumference, the relationship between pitch length and the total number of pitches (total combined number of pitches for both sets of alternating lugs, i.e., the set emanating from tread edge 15 and the set emanating from tread edge 16) is $P = 4 \times CIRC./N$; the curvature radius for the leading and trailing edges of the lugs is preferably taken as $R = P \times 1.5$, and thus can also be determined by $R = 6 \times CIRC./N$.

In terms of defining the portion of each pitch occupied by the lugs, the width of both the long and medium lugs as measured at their emanation point at the tread shoulder or edge (distance between trailing and leading edges at the shoulder, i.e., distance 30 in FIG. 3), is designed to be in the range of from about 0.10 to about 0.15 times the pitch length, more preferably from about 0.10 to about 0.13 times the pitch length, and most preferably about 0.12 times the pitch length. Due to the gradual tapering of the lug width as the lug moves axially inward toward the centerline, the lug width at the end of the bar portion of the lug (i.e., the perpendicular distance between the leading and trailing edges just prior to the bulbous head portion, i.e., distance (31) in FIG. 3) is designed to be in the range of from about 0.7 to about 0.9 of the width at the shoulder area, more preferably about 0.75 to about 0.85 of the width at the shoulder area, and most preferably about 0.80 of the width at the shoulder area.

The smoothly curved bar portion of the lugs, having leading and trailing edges defined by the same radius of curvature, gradually increases in angularity in the axial inward direction. This increasing angularity can be expressed in terms of the curvature angle ($\alpha$) of the leading or trailing edges at any given point therealong, with reference to an axis perpendicular to the centerline at such point, such curvature angle increasing as the point progresses axially inward. Thus, as shown in FIG. 3, the angle $\alpha$ at a point a short distance axially inward from tread edge (16) is smaller than the angle $\alpha$ at a more axially inward point.

The smoothly curved bar portion (22d, 23d) of both the long and medium lugs terminates before reaching the centerline, although extending closer to the centerline for the long lug than is the case for the medium lug. At the termination of the smoothly curved bar portion, the lug continues with a bulbous portion smoothly transitioned into the bar portion, the bulbous portion presenting a relatively rounded nose in the leading edge direction. For the long lugs, the bulbous end portion causes the overall lug to cross the centerline as well as to cross the half-pitch line, while for the medium lug, the overall lug including the bulbous portion still terminates short of the centerline and short of the next half-pitch line.

In further definition of the curvature of the smoothly curved bar portion of the long and medium lugs, the curvature of the trailing edge of the smoothly curved bar portion of the lug is such that its projection axially inward will intersect the center line a distance "x" from the applicable half pitch line (60), i.e., from a line drawn between the tread-edge emanating points for the trailing edge of a medium lug in the same lug set as the long lug in question and for the trailing edge of the long lug opposite it in the other lug set. The distance "x" is typically from about 3 to 5% of the pitch length, and most preferably about 3.9% of the pitch length.

In yet further definition of the long and medium lugs, the overall length of the long lugs, measured on a curve (illustrated as 35 in FIG. 3) equal to the radius of the leading and trailing edges and bisecting the lug along its width, and starting from the tread edge and ending at the point (36) on the center line, is from about 67 to 75% of the arc width (i.e., the axial distance between tread edges (15) and (16), shown as distance 50 in FIG. 3). The point (36) on the center line is at a distance beyond the applicable half pitch line (60) of from about 12 to 17% of the pitch length, more preferably from about 13 to 16% of the pitch length, and most preferably about 15% of the pitch length.

For the medium lugs, the same overall length measurement is employed, i.e., measured on a curve (37) equal to the radius of the leading and trailing edges and bisecting the lug along its width, starting at the tread edge and terminating at point (38), this length being from about 49 to about 54% of the arc width. The point (38) is at a distance short of the applicable half pitch line (60) by an amount equal to from about 1 to about 3% of the pitch length, most preferably about 1.5 to about 1.6% of the pitch length; axially, the point (38) is at a distance short of the centerline (i.e., axially outward therefrom) equal to about 8 to 12% of the arc width, most preferably from about 10 to 11% of the arc width.

The bulbous head portion (22e) or (23e) of the long and medium lugs can take any number of configurations, characterized by being enlarged relative to the bar portion width and presenting a rounded leading edge. As previously noted, the bulbous head portion is such that it causes the long lugs to extend beyond the applicable half pitch line and to cross the centerline, while for the medium lugs the head portion is such that the medium lugs stop short of the applicable half pitch line and do not cross the centerline.

Figure 5:
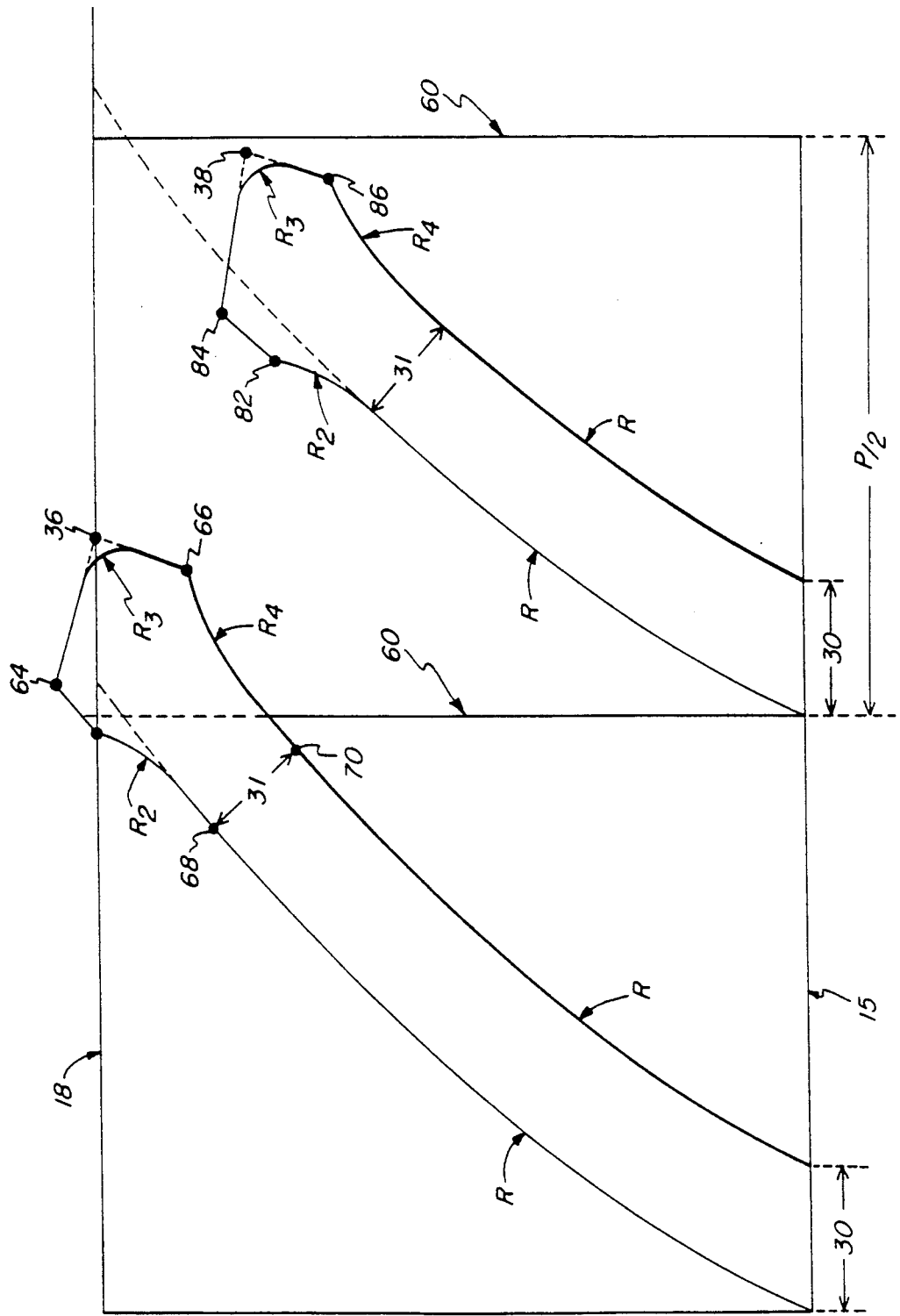
FIG. 5 is a magnified portion of the plan view of FIG. 3 focusing on the preferred construction of the bulbous head of the lugs.

The preferred construction of the bulbous head portion is in the form of a spade head. FIG. 5, showing one entire long lug and one entire medium lug emanating from a single tread edge (e.g., tread edge 15), schematically illustrates the shape of the spade head and the construction points used in its design.

For the long lugs, the previously noted point (36) is at a distance on the centerline, beyond the half pitch line (60), by an amount equal to about 15% of the pitch length in the preferred embodiment. There is also a point (62) on the centerline, which is short of the half pitch line (60) by a distance equal to about 1 to 3%, preferably 2%, of the pitch length. This same distance also fixes a point (64) beyond the half pitch line (60), but translated in the positive -y direction (i.e., beyond the centerline) a distance equal to about 1.8 to 3.5%, preferably 2.8%, of the arc width. Yet another point (66) is fixed beyond the half pitch line (60) a distance equal to about 10 to 14%, preferably 12.4%, of the pitch length, and axially short of the centerline (i.e., negative -y direction) a distance equal to about 5 to 7%, preferably 6.3%, of the arc width.

A given radius of curvature R for the leading and trailing edges of the long lug bar portion, and a width therebetween at the tread edge, permits a trailing edge to be designed which intersects the centerline the earlier-noted distance "x" beyond the half pitch line (60). Using construction point (62), and a radius of curvature $R_2$ equal to about 13 to 15% of the arc width, preferably about 14.2% of the arc width, results in a point of tangency between R and $R_2$ at point (68). A perpendicular line therefrom to a distance earlier-noted as (31) (i.e., about 0.7 to 0.9, most preferably 0.8 of the shoulder lug width), provides construction point (70) for the leading edge curvature. A straight line portion is provided between points (62) and (64), and straight line projections from point (64) to point (36) and from point (66) to (36) provide a grid within which to provide a curved segment in the leading edge direction having a radius of curvature $R_3$ equal to about 0.4 to 0.6%, preferably about 0.5%, of radius of curvature R. A curved segment between point (70) and point (66) ($R_4$) completes the spade head design.

The spade head construction for the medium lugs is similarly arrived at, although the construction points are translated in x- and y- directions which reflect that the spade head does not cross the centerline and terminates short of the relevant half pitch line (60). Thus, as shown in FIG. 5, and as previously noted, the construction point (38) resides at a distance short of the half pitch line (60) equal to from about 1 to about 3% of the pitch length, and a distance short of the centerline equal to from about 8 to 12%, most preferably 10-11%, of the arc width. Construction point (86) is a distance short of the half pitch line (60) equal to from about 3 to 5%, preferably 4%, of the pitch length, and a distance short of the centerline equal to from about 14 to 18%, preferably 15-17%, of the arc width. Construction point (84) is a distance short of the half pitch line (60) equal to about 14 to 18%, preferably 15-16%, of the pitch length, and a distance short of the centerline equal to from about 7 to 9%, preferably 8-9%, of the arc width. Construction point (82) resides at a distance short of the half pitch line (60) equal to 18 to 22%, preferably about 19-21%, most preferably 19.8%, of the pitch length, and a distance short of the centerline equal to from 10-14%, preferably 12-13%, most preferably about 12.5%, of the arc width.

From these construction points, the procedure established for the long lugs is followed (using the same R, $R_2$ and $R_3$) to construct the medium lug and the spade head therefor.

As will be noted, the preferred spade head construction is based upon construction points which are fixed relative to the pitch length (for x-axis or circumferential directions) and the arc width (for y-axis or axial directions), and hence are readily translated for constructions for any tire of given pitch length and arc width.

The upstanding walls of the lugs may if desired be essentially perpendicular to the tread base, but generally it is desired to taper the walls inwardly from the tread base to the top of the lug, i.e., a gradual taper in the radial outward direction. The taper need not be the same for the leading and trailing walls of the lugs, and, as is conventional in lug design, the lug walls are radiused at their base so as to smoothly transition into the tread base. Generally, it is desired that the leading and trailing walls taper outwardly from their top to their bottom area at the tread base at an angle of from 15 to 25°. The non-skid depth is generally chosen to be in conformance with the standards of the Tire and Rim Association.

As is commonplace in the industry, the various lengths, angles and relationships set forth herein have reference to the molded dimensions of the tire. Generally speaking, these tread dimensions and relationships also will identically exist when the tire is mounted on its proper rim and inflated to its design pressure.

While certain embodiments have been set forth for purposes of illustrating the invention, it will be appreciated by those skilled in the art that a variety of modifications and alterations can be employed, and it is not intended that the invention be limited to the specifically illustrated features except as set forth in the appended claims.

What is claimed is:

1. A pneumatic tire for tractors and like vehicles comprising a ground surface-engaging tread portion surrounding a reinforcing carcass, said tread portion comprising:

(a) a first set of long lugs and a first set of medium lugs alternately disposed about the circumferential periphery of the tread, each lug of said first set of long lugs and said first set of medium lugs being upstanding from the tread base and emanating from the same lateral edge of said tread and extending axially inward therefrom, the spacing of said alternately disposed lugs about said circumferential periphery being such that void space exists in the tread between each alternating lug, the emanation point of each long or medium lug along the lateral tread edge being substantially equally spaced apart along the lateral tread edge from the emanation point of the next alternating lug;

(b) a second set of long lugs and a second set of medium lugs being identical to said first set of long lugs and said first set of medium lugs but opposite in hand, alternately disposed about the circumferential periphery of the tread and emanating from the other lateral edge of said tread and extending axially inward therefrom, the alternating circumferential disposition of said second set of long lugs and said second set of medium lugs being offset relative to the disposition of said first set of long lugs and said first set of medium lugs such that across the tread width, an emanating point for a medium lug along one lateral tread edge is substantially directly opposite an emanating point for a long lug along the other lateral tread edge; wherein:

(i) each said lug comprises (1) a bar portion commencing from said lateral tread edge which is smoothly curved along its length from the emanating point of said lug at said lateral tread edge to the termination point of said bar portion axially inward thereof, the direction of axially inward curvature being in the direction of intended tire rotation, said bar portion having spaced-apart leading and trailing edges having the same radius of curvature and oriented such that the width of said bar portion, measured as the perpendicular distance between said spaced-apart leading and trailing edges, progressively decreases from said emanating point of said bar portion at said lateral tread edge to said termination point of said bar portion axially inward thereof, and (2) a bulbous head portion transitioned from said bar portion axially inward of the termination point of said bar portion, said bulbous head portion having a rounded leading edge;

(ii) said tread having circumferential pitch length equal to the length along a lateral tread edge from the trailing edge of a long or medium lug to the trailing edge of the next similar lug emanating from the same tread edge;

(iii) each said long lug extending axially inward beyond the centerline of said tread and circumferentially extending greater than one-half the pitch length, and each said medium lug terminating axially outward of said centerline and circumferentially extending less than one-half the pitch length;

(iv) the length of said long lugs being from about 67 to about 75% of the arc width of said tread, said length measured on a curve equal to the radius of curvature of said leading and trailing edges of said bar portion and bisecting said bar portion, from the emanation point of said long lugs at said tread edge to a termination point along said centerline and disposed beyond the half-pitch distance a distance of from about 12 to 17% of the pitch length; and (v) the length of said medium lugs being from about 49 to about 54% of the arc width, said length measured on a curve equal to the radius of curvature of said leading and trailing edges of said bar portion and bisecting said bar portion, from the emanation point of said medium lug along said tread edge to a termination point which is axially outward of the centerline by a distance equal to about 8 to 12% of the arc width and which is short of the half-pitch distance a distance of from about 1 to 3% of the pitch length.

2. The pneumatic tire according to claim 1 wherein the distance, measured along the lateral tread edge, between the trailing and leading edges of the bar portion of said lugs, is from about 0.10 to about 0.15 of the pitch length.

3. The pneumatic tire according to claim 2 wherein the distance, measured along the lateral tread edge, between the trailing and leading edges of said bar portion of said lugs, is about 0.12 of the pitch length.

4. The pneumatic tire according to any of claims 1 to 3 wherein the perpendicular distance between the trailing and leading edges of said bar portion of said lugs at the axially inward termination of said bar portion, is from about 0.7 to about 0.9 of the distance between the trailing and leading edges of said bar portion measured along the lateral tread edge.

5. The pneumatic tire according to any of claims 1 to 3 wherein the perpendicular distance between the trailing and leading edges of said bar portion of said lugs at the axially inward termination of said bar portion, is 0.8 of the distance between the trailing and leading edges of said bar portion measured along the lateral tread edge.

6. The pneumatic tire according to claim 1 wherein the curvature angle formed between a line tangent to a point on said leading or trailing edge of the bar portion of said lugs, and a line, through said point, perpendicular to the centerline, increases as said point progresses axially inward.

7. The pneumatic tire according to claim 1 wherein the radius of curvature of the leading and trailing edges of the bar portion of said lugs is equal to about 1.5 times the pitch length.

8. The pneumatic tire according to claim 1 wherein an axially inward projection of the trailing edge of the bar portion of said lugs intersects the tread centerline a distance, circumferentially beyond the half-pitch distance, equal to from about 3 to about 5% of the pitch length.

9. The pneumatic tire according to claim 1 wherein said bulbous head portion of said lugs has a rounded leading edge defined by a radius of curvature equal to from about 0.4 to about 0.6% of the radius of curvature of said leading and trailing edges of said bar portion of said lugs.

10. The pneumatic tire according to claim 1 wherein said bulbous head portion of said long lugs constitutes a six-sided head portion, a first side thereof consisting of a reversely-curved segment extending from the termination point of the trailing edge of the bar portion of said lug to a first termination point on said tread centerline and short of said half-pitch distance; a second side consisting of a substantially linear segment extending from said first termination point to a second termination point a predetermined distance beyond said centerline and a predetermined distance beyond said half-pitch distance; a third side consisting of a substantially linear segment constituting a portion of a linear projection extending from said second termination point, toward said centerline, to a third termination point on said centerline at a greater distance beyond said half-pitch distance than is said second termination point, said third side terminating along said linear projection before intersecting said centerline; a fourth side consisting of a curved segment extending form a termination point of the leading edge of said bar portion of said lug which is perpendicularly across from said termination point of said trailing edge, to a fourth termination point beyond said half-pitch distance and short of said centerline; a fifth side consisting of a substantially linear segment constituting a portion of a linear projection from said fourth termination point to said third termination point, said fifth side terminating along said linear projection before intersecting said centerline; and a sixth side consisting of a curved segment between the terminating points of said third and fifth sides and intersecting said centerline, such that said bulbous head portion has a rounded leading edge along said centerline consisting of said sixth side.

11. The pneumatic tire according to claim 10 wherein the radius of curvature of said first side is from about 13 to about 15% of the arc width; said first termination point is short of the half-pitch distance by a distance of from about 1 to about 3% of the pitch length; said second termination point being beyond said centerline by a distance of from about 1.8 to about 3.5% of the arc width; said third termination point is at a distance beyond the half-pitch distance of about 15% the pitch length; said fourth termination point is beyond the half-pitch distance by an amount of from about 10 to 14% of the pitch length, and axially short of the centerline a distance of from about 5 to 7% of the arc width; and the radius of curvature of said sixth side is from about 0.4 to 0.6% of the radius of curvature of said leading and trailing edges of said bar portion.

12. The pneumatic tire according to claim 1 wherein said bulbous head portion of said medium lugs constitutes a six-sided head portion, a first side thereof consisting of a reversely-curved segment extending from the termination point of the trailing edge of the bar portion of said lug to a first termination point short of the centerline and short of the half-pitch distance; a second side consisting of a substantially linear segment extending from said first termination point to a second termination point axially-inward of said first termination point and short of the half-pitch distance by an amount less than for said first termination point; a third side consisting of a substantially linear segment constituting a portion of a linear projection from said second termination point to a third termination point short of the half-pitch distance by an amount less than for said second termination point and further short of the centerline than said second termination point; a fourth side consisting of a curved segment extending from a termination point of the leading edge of said bar portion which is perpendicularly across from said termination point of said trailing edge, to a fourth termination point further short of the centerline than said third termination point and short of the half-pitch distance by an amount less than for said second termination point but greater than for said third termination point; a fifth side consisting of a substantially linear segment constituting a portion of a linear projection from said fourth termination point to said third termination point; and a sixth side consisting of a curved segment between the terminating points of said third and fifth sides such that said bulbous head portion has a rounded leading edge consisting of said sixth side.

13. The pneumatic tire according to claim 12 wherein the radius of curvature of said first side is from about 13 to from 15% of the arc width; said first termination point is short of the half-pitch distance by an amount of from about 18 to 22% of the pitch length, and short of the centerline by a distance of from 10 to 14% of the arc width; said second termination point is short of the half-pitch distance by an amount of from 14 to 18% of the pitch length, and short of the centerline by a distance of from 7 to 9% of the arc width; said third termination point is short of the half-pitch distance by an amount of from 1 to 3of the pitch length, and short of the centerline by a distance of from 8 to 12% of the arc width; said fourth termination point is short of the half-pitch distance by an amount of from about 3 to 5%, and short of the centerline by a distance of from 14 to 18% of the arc width; and the radius of curvature of said sixth side is from about 0.4 to 0.6% of the radius of curvature of said leading and trailing edges of said bar portion of said lugs.

* * * * *

UNITED STATES PATENT AND TRADEMARK OFFICE
CERTIFICATE OF CORRECTION

PATENT NO.   : 5,056,573
DATED        : October 15, 1991
INVENTOR(S)  : J.P. O'Brien, et al It is certified that error appears in the above-identified patent and that said Letters Patent is hereby corrected as shown below:

On the title page insert:

--[73] Assignee:  Pirelli Armstrong Tire Corporation--.

Signed and Sealed this

Sixteenth Day of March, 1993

Attest:

STEPHEN G. KUNIN

Attesting Officer

Acting Commissioner of Patents and Trademarks